Jan. 28, 1964   J. MARR   3,119,625
CENTERING OF TOOL ELEMENTS
Filed March 20, 1961

INVENTOR.
JAMES MARR
BY Richard W. Treverton
ATTORNEY

United States Patent Office 3,119,625
Patented Jan. 28, 1964

3,119,625
CENTERING OF TOOL ELEMENTS
James Marr, Rochester, N.Y., assignor to The Gleason Works, Rochester, N.Y., a corporation of New York
Filed Mar. 20, 1961, Ser. No. 96,933
6 Claims. (Cl. 279—16)

The present invention relates to the centering of machine tool elements, for example chucks and cutters, on spindles of the machines.

The object of the invention is a simple and inexpensive arrangement which will positively center the tool element with great precision.

The arrangement according to the invention comprises a machine tool spindle having a plane front face, a cylindrical bore, and a plane face recessed within the bore, said plane faces being perpendicular to the rotation of the spindle and said bore being coaxial with said axis, a tool element having a plane face for seating on said plane front face of the spindle and a center within the bore having an external cylindrical surface perpendicular to said plane face of the tool element, a centering ring and a compression ring disposed in said bore and around said external cylindrical surface, said rings being in end-to-end relation to each other, one ring abutting said plane face of the tool element and the other ring abutting said recessed plane face, the centering ring being adapted to contract and expand respectively radially inwards and radially outwards upon axial compression, for centering contact with both said bore and said cylindrical surface, said compression ring being adapted for axial flexure to exert an axial compression force against the centering ring, and means for drawing said tool element axially against the spindle to thereby effect such flexure of the compression ring. The preferred centering ring is of truncated V-formation in axial section, with the free ends of both legs and the central portion of said formation adapted for such centering contact. The preferred compression ring is of frusto-conical form with one end thereof adapted for plane surface contact with the adjacent leg of said V-formation and the other end thereof adapted for like surface contact with one of said plane faces.

Figure 1:
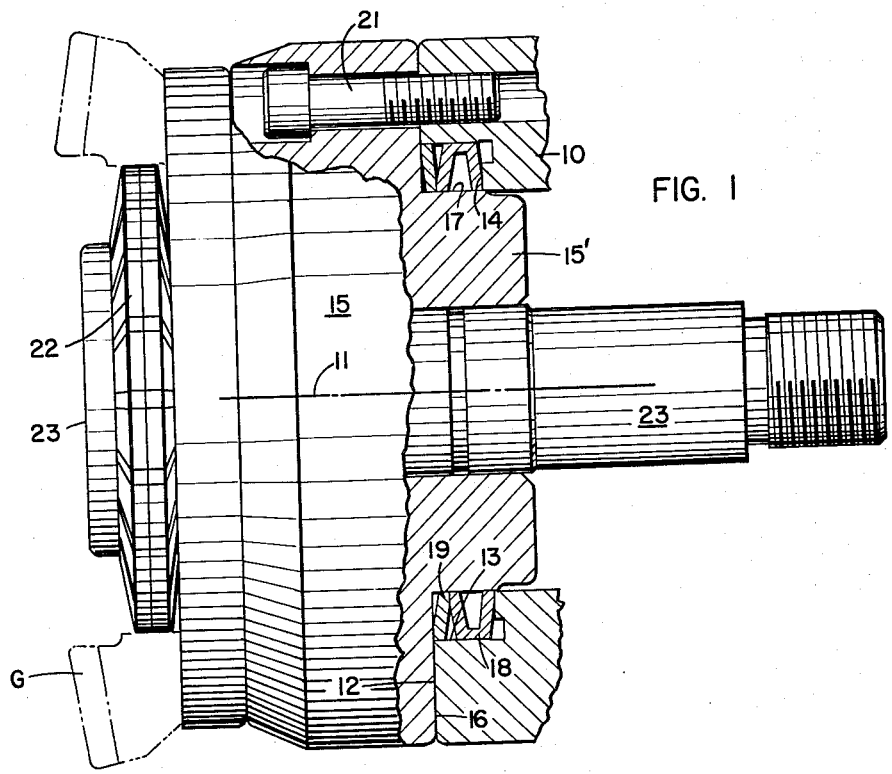
Figure 2:
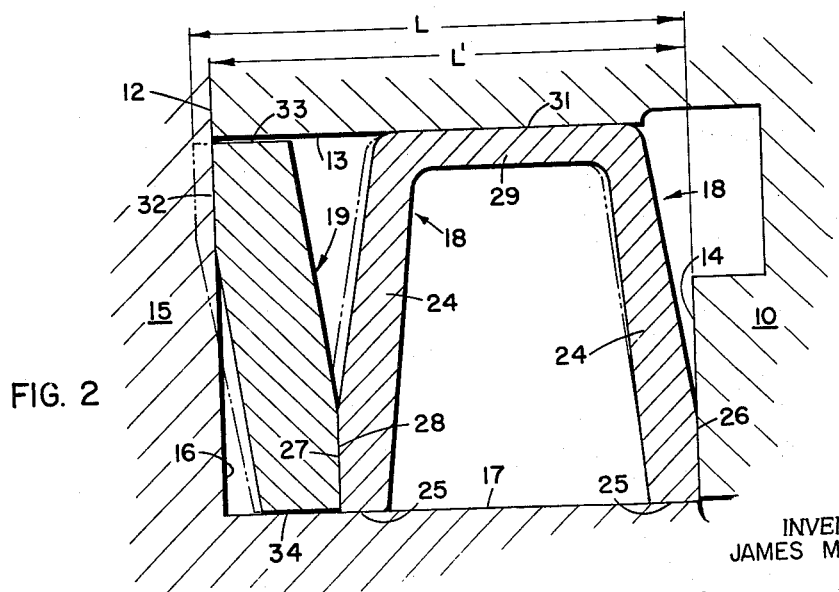

A preferred embodiment of the invention is shown in the accompanying drawings, wherein:

FIG. 1 is an axial section through the work holder and spindle assembly of a machine tool; and, FIG. 2 is a detail section, also in an axial plane, showing on a larger scale the centering ring and the compression ring of the assembly.

The machine tool spindle 10, in this instance the work spindle of a bevel gear cutting machine, is rotatable in the machine about axis 11. The spindle has a plane front face 12 perpendicular to axis 11, a cylindrical bore 13 coaxial with said axis, and, recessed, at the inner end of this bore, a plane face 14 also perpendicular to axis 11. A chuck body 15 has a plane face 16 for seating on face 12 of the spindle and a centering portion 15′ disposed within bore 13 and having an external cylindrical surface 17. A centering ring 18 and a compression ring 19, both of steel, are disposed in the annular space defined by bore 13, external cylindrical surface 17, and plane faces 14 and 16. A plurality of headed screws 21 extend through oversize openings in the chuck body and are screw-threaded into the spindle. The screws are parallel to axis 11 and are arranged in a circle therearound. Their function is not only to draw and hold the chuck body against the spnidle, but, as will be explained below, to effect centering action by ring 18 so that cylindrical surface 17 will be precisely coaxial with axis 11.

The particular chuck shown is of the expanding arbor type, adapted for supporting a ring gear G whose teeth are to be cut on the machine. For this purpose the chuck has a flexible slotted collet 22 adapted to expand radially to grip the bore of the gear upon rearward motion of draw stem 23 by a suitable actuator, not shown, connected to the screw-threaded end thereof. However the means for holding the gear on the body 15 constitute no part of the present invention. In fact insofar as the invention is concerned the body 15 might be the blade-supporting head of a milling cutter, and the spindle 10 to the cutter spindle of the machine.

All of the surfaces of the rings 18 and 19 are coaxial surfaces of revolution. As shown in FIG. 2, the centering ring 18 is of truncated V-formation in axial section, the free ends of the legs 24 of the V-formation having internal cylindrical surfaces 25, which, in the unflexed condition of the ring, are very slightly larger (by about 0.0002 to 0.0005 inch or 0.005 to 0.013 mm.) than the diameter of external cylindrical surface 17, which in the particular case illustrated has a diameter somewhat greater than three inches, and about 75 mm. The legs also have plane faces 26 and 27, respectively for abutment with recessed plane surface 14 of the spindle 10 and a plane surface 28 of compression ring 19. The central portion 29 of ring 18 is preferably slightly thinner than legs 24 and has a cylindrical surface 31 which is slightly smaller in diameter (by about 0.001 inch or 0.025 mm.) than bore 13 when the ring is unflexed. Compression ring 19 is in the form of a frusto-conical washer or Belleville spring and is slightly thicker than the legs 24 of ring 18. It has a plane surface 32 for seating on surface 16 of body 15 and cylindrical surfaces 33 and 34 respectively slightly smaller and larger in diameter than bore 13 and surface 17 even when it is in fully compressed condition, as shown in full lines in FIG. 2. When the rings are unflexed, as shown in broken lines in FIG. 2, their total length L is greater by about 0.015 inch or 0.38 mm. than the length L′ thereof in compressed condition.

In assembly, as the body 15 is drawn against the spindle 10 by tightening of screws 21 the rings 18 and 19 are compressed axially. As a result the ring 18 contracts and expands respectively radially inwards and radially outwards into firm contact with surfaces 17 and 13 even before the surface 16 is drawn tightly against surface 12. The final tightening action results in a further axial compression of ring 19 which is permitted by reason of the initial clearance between surfaces 33 and 13 and between surfaces 34 and 17.

Having now described the preferred embodiment, what I claim as my invention is:

1. A machine tool assembly comprising a spindle having a plane front face, a cylindrical bore, and a plane face recessed within the bore, said plane faces being perpendicular to the rotation axis of the spindle and said bore being coaxial with said axis, a tool element having a plane face for seating on said plane front face of the spindle and a center within the bore having an external cylindrical surface perpendicular to said plane face of the tool element, a centering ring and a compression ring disposed in said bore and around said external cylindrical surface, said rings being in end-to-end relation to each other, one ring abutting said plane face of the tool element and the other ring abutting said recessed plane face, the centering ring being adapted to contract and expand respectively radially inwards and radially outwards upon axial compression, for centering contact with both said bore and said cylindrical surface, said compression ring being adapted for axial flexure to exert an axial compression force against the centering ring, and means for drawing said tool element axially against the spindle to thereby effect such flexure of the compression ring.

2. An assembly according to claim 1 in which the centering ring is of truncated V-formation in axial section, with both legs and the central portion of said formation adapted for said centering contact.

3. An assembly according to claim 2 in which the central portion and the free ends of said legs of said formation have coaxial cylindrical surfaces adapted for such centering contact, and the surfaces of the legs at the two ends of the centering ring are plane surfaces perpendicular to said coaxial cylindrical surfaces.

4. An assembly according to claim 3 in which the compression ring is of frusto-conical form, having outer and inner cylindrical surfaces offset axially from each other, there being clearance between said cylindrical surfaces and the adjacent spindle bore and the adjacent external cylindrical surface of said center when the ring is uncompressed, and the ring having plane surfaces on the opposite sides thereof, adjacent said cylindrical surfaces thereon, one of said plane surfaces being in abutment with one of said plane surfaces of the centering ring.

5. An assembly according to claim 1 in which the compression ring is of frusto-conical form, and there is clearance between outer peripheral portion thereof and said bore and also between the inner peripheral portion thereof and the external cylindrical surface of said center.

6. An assembly according to claim 5 in which the inner and outer surfaces of the compression ring are cylindrical and the two end faces thereof, respectively adjacent said cylindrical surfaces thereof, are plane surfaces.

References Cited in the file of this patent

UNITED STATES PATENTS

| | | |
|---|---|---|
| 2,361,324 | Severson | Oct. 24, 1944 |
| 2,828,672 | McMullen | Apr. 1, 1958 |
| 3,041,898 | Better | July 3, 1962 |

FOREIGN PATENTS

| | | |
|---|---|---|
| 869,892 | Germany | Mar. 9, 1953 |
| 872,886 | Germany | Apr. 9, 1953 |